(No Model.)
J. C. & P. M. GUERRANT.
Chair Bottom.
No. 242,633. Patented June 7, 1881.
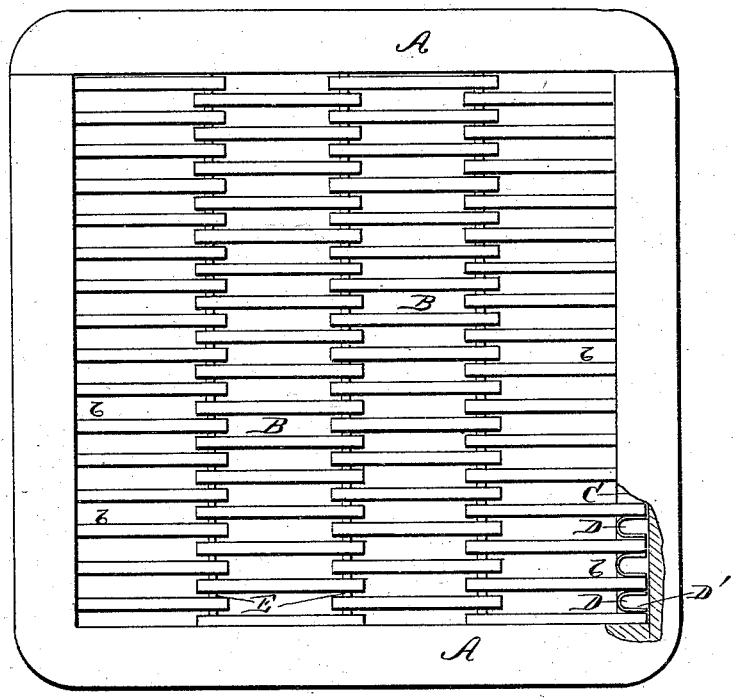
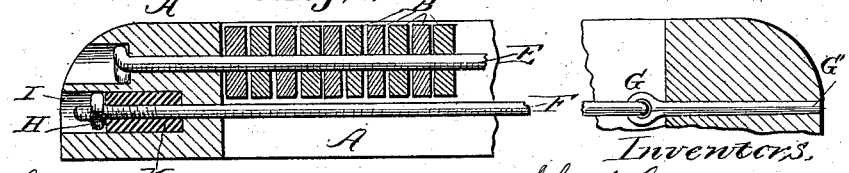

UNITED STATES PATENT OFFICE.

JOHN C. GUERRANT AND PETER M. GUERRANT, OF DANVILLE, VIRGINIA.

CHAIR-BOTTOM.

SPECIFICATION forming part of Letters Patent No. 242,633, dated June 7, 1881.

Application filed April 1, 1881. (No model.)

*To all whom it may concern:*

Be it known that we, JOHN C. GUERRANT and PETER M. GUERRANT, of Danville, in the county of Pittsylvania and State of Virginia, have invented certain new and useful Improvements in Chair-Seats; and we do hereby declare that the following is a full, clear, and exact description thereof, reference being had to the accompanying drawings, and to the letters of reference marked thereon, which form part of this specification, and in which—

Figure 1 is a plan view of our chair-bottom, partly in section; and Fig. 2 is a vertical cross-section through the same.

Our invention relates to spring-seats for chairs, the object being to provide a light, cheap, and durable spring-seat, which, after it has become too much depressed by constant use, can be readily raised by increasing the tension of the springs.

The improvement relates to the manner of constructing the seat by means of slats and supporting-wires, to the mode of separating the outer ends of two of the series of slats composing the seat, and to spring-wires connected with bolts having nuts arranged to bear upon elastic cushions, so that by tightening up the nuts the seat can be raised, as hereinafter more fully described.

A indicates the seat-frame, which is composed of bars secured together by mortise-and-tenon joints in the usual way. The seat within this frame is composed of several series of short slats, B, arranged in parallel lines with the ends of one series interposed between the ends of the next adjacent series of slats, as illustrated. The outer ends of the slats of the two outer series, b b, extend into channels C, formed in the inner sides of the frame, the said ends of the slats being separated by the bends D D of metal strips D' that are arranged in the channels.

E E indicate wires that pass through the contiguous ends of the slats, these wires being secured to the frame in any suitable way.

In order to provide auxiliary spring-supports for the seat, we employ spring-wires F, that pass transversely across the under sides of the slats. The ends of each one of these wires are connected at one side of the frame with hooks or eyes G of the bolts G', the wire being secured to the opposite side of the frame by passing through perforations formed through one of the frame-bars. The bolts pass loosely through the frame, and are provided upon their outer screw-threaded ends with nuts H, which can be tightened up in order to increase the tension upon the spring-wires when the seat becomes depressed by usage. In the outer side of the frame through which the bolts pass are formed the mortises I I, and in each mortise is fitted an elastic cushion, K. The bolts pass through these cushions, and the nuts upon the bolts bear against the outer sides of the same, so that the tension upon the bolts will have a tendency to contract the elastic cushions, which thus give the desired degree of elasticity to the seat.

Having thus described our invention, what we claim is—

1. The combination, with a chair-frame, of a seat composed of a series of short slats arranged in parallel lines and supported by rods or wires passing transversely through them and secured to the sides of the frame, all substantially as herein described.

2. The combination, with the seat-frame having channels C in two of its inner sides, of the several series of slats B, the wires E passing through the slats and secured to the frame, and the strips D', formed with bends that separate the ends of the slats which extend into the channels of the frame, substantially as described.

3. The combination, with the seat-frame, of the several series of slats B, arranged in parallel lines, the wires E, passing through the slats and secured to the frame, the bolts passing through the frame and through elastic cushions arranged within mortises formed in the outer side of the said frame, the nuts arranged upon the screw-threaded outer ends of the bolts and adapted to be tightened up against the elastic cushions, and the seat-supporting spring-wires secured at their ends to the bolts at one side of the frame, and passing through perforations at the opposite side of the frame, substantially as described.

In testimony that we claim the foregoing as our own we affix our signatures in presence of two witnesses.

JOHN C. GUERRANT.
PETER M. GUERRANT.

Witnesses:
P. T. BARROW,
J. W. DAILEY.